United States Patent [19]
Armstrong et al.

[11] Patent Number: 5,559,828
[45] Date of Patent: Sep. 24, 1996

[54] TRANSMITTED REFERENCE SPREAD SPECTRUM COMMUNICATION USING A SINGLE CARRIER WITH TWO MUTUALLY ORTHOGONAL MODULATED BASIS VECTORS

[76] Inventors: John T. Armstrong, 297 S. Roosevelt Ave., Pasadena, Calif. 91107; John D. Richert, 460 Avocado Crest Rd., La Habra Heights, Calif. 90631

[21] Appl. No.: 324,844

[22] Filed: Oct. 18, 1994

Related U.S. Application Data

[63] Continuation-in-part of Ser. No. 246,068, May 16, 1994, abandoned.
[51] Int. Cl.$^6$ .............. H04B 1/69; H04B 1/707; H04J 13/02; H04J 13/04
[52] U.S. Cl. .......... 375/200; 375/205; 375/206; 380/34; 370/18
[58] Field of Search ............... 375/200, 205, 375/206, 208, 209, 210; 380/34; 370/18, 19, 20, 21, 22, 23

[56] References Cited

U.S. PATENT DOCUMENTS

| | | | |
|---|---|---|---|
| 4,862,478 | 8/1989 | McIntosh | 375/200 |
| 5,081,643 | 1/1992 | Schilling | 375/200 |
| 5,081,645 | 1/1992 | Resnikoff et al. | 375/210 |
| 5,241,561 | 8/1993 | Barnard | 375/200 |
| 5,243,622 | 9/1993 | Lux | 375/206 |
| 5,278,826 | 1/1994 | Murphy et al. | 370/18 X |
| 5,315,583 | 5/1994 | Murphy et al. | 370/18 |
| 5,329,547 | 7/1994 | Ling | 375/205 |
| 5,345,472 | 9/1994 | Lee | 375/205 |
| 5,414,699 | 5/1995 | Lee | 370/18 |

OTHER PUBLICATIONS

Dixon, Robert C.: *Spread Spectrum Systems*, 2nd Edition, Wiley Interscience 1984, pp. 7–9, 224–226.

Gel'fand, I. M.: *Lectures on Linear Algebra*, Interscience Publishers 1961, pp. 6–34.

Golomb, Solomon W.: *Shift Register Sequence*, Revised Edition, Aegean Park Press, 1982, pp. 24–37.

Shanmugam, K. Sam: *Digital and Analog Communications Systems*, John Wiley & Sons, 1979, pp. 390–393.

Simon, Omura, Scholtz, and Levit: *Spread Spectrum Communications*, Computer Science Press 1985., vol. I, pp. 1–9.

Stroke, George: *An Introduction to Holography and Coherent Optics*, 2nd Edition, Academic Press 1969 pp. 211–218.

*Primary Examiner*—Bernarr E. Gregory
*Attorney, Agent, or Firm*—Robbins, Berliner & Carson

[57] ABSTRACT

The disclosed spread spectrum system has the reference transmitted on one phase (basis vector) of a π/2-offset QPSK signal, and the spread data signal transmitted on another phase (basis vector). The two received phases are combined to recover the baseband signal. Such a transmission system is tolerant to multipath dispersion since all delay paths carry an appropriately delayed reference and signal path induced dispersion on the spread data signal is also present on the reference. If one of the two signals is delayed by a predetermined time interval and a corresponding delay is present in each of two cross-coupled signal processing paths following a conventional I-Q demodulator, the resulting two phase quadrature baseband signals may be combined to form a replica of the original baseband signal. The resultant asynchronous demodulation eliminates the usual requirement for carrier lock at the receiver and is therefore tolerant to Doppler shifts and other frequency errors. Both the asynchronous and synchronous (coherent demodulation) embodiments offer multiple use of the same center frequency through a novel "delay division" multiplexing concept.

29 Claims, 8 Drawing Sheets

TRANSMITTED REFERENCE SPREAD SPECTRUM COMMUNICATION USING A SINGLE CARRIER WITH TWO MUTUALLY ORTHOGONAL MODULATED BASIS VECTORS

This application is a CIP of 08/246,068, filed May 16, 1994, now abandoned.

TECHNICAL FIELD

The present invention relates to spread spectrum communications over a communications channel which may be electrical (wire), acoustical, optical, or electromagnetic (radio frequency). More specifically, the invention relates to a spread spectrum communications system which incorporates a reference signal co-mingled with the spread spectrum message signal in such a manner that the reference signal remains separable from the spread spectrum message signal.

BACKGROUND ART

Communications messages transmitted over a transmission medium (which may be electrical, acoustical, optical, or electromagnetic) are subjected to various delays and distortions caused by channel characteristics such as dispersion, fading, multipath, etc. Accordingly, one of the functions of a communications receiver is to remove distortions in the message caused by such channel characteristics.

Pseudo random noise (PRN) modulated signals are generally known as "spread spectrum" signals because they utilize time sequences to synthesize a signal having wideband frequency attributes. The use of spread spectrum techniques to transmit messages through noisy or hostile RF channels is well known.

In spread spectrum communications, a narrowband message is convolved with a wideband noise source, such as a pseudo random noise ("PRN") generator, or the amplified output of a noise diode, or any such randomized signal source.

For consistency in terminology, the following definitions relating to the spread spectrum process are used herein: A "chip" is the basic value of the randomized signal source for a duration of time equal to the reciprocal of the code clock frequency ("chipping rate"). A "bit" is used herein to refer to the basic value of the message for a duration of time equal to the reciprocal of the data clock ("bit rate"). The "chip-to-bit ratio" ("C/B") refers to the ratio of the code clock frequency to that of the data clock. An increased C/B results in an increased transmitted signal bandwidth relative to the message bandwidth and a higher process gain for the spread spectrum system. The terms "PN" and "PRN" and "m-sequences" refer to maximal length pseudo (random) noise, which is a deterministic signal with noise-like characteristics, usually generated with (linear or non-linear) feedback shift registers or toggle registers.

Spread spectrum systems typically utilize a pseudo random noise (PN) generator clocked at a high chipping rate relative to the data bit clock. Code generators are typically constructed with a feedback shift register generator configured to provide a maximal length code which is used to spread the message, and an identical code generator at the receiver, which, after proper synchronization, will de-spread the received message. Synchronization typically involves a three step process, first obtaining code clock synchronization and then code phase synchronization, and finally data clock synchronization. Until code clock and phase synchronization is achieved, no message information is recoverable; moreover, due to the code clock alignment criteria used to obtain code phase synchronization, such prior art systems intrinsically ignore message carrying signals which arrive by paths differing in delay by more than one chip. Moreover, in systems where the PN modified message is modulated onto a carrier, an additional initial synchronization step is required to regenerate a phase coherent replica of the carrier at the receiver.

Prior art spread spectrum systems also include transmitted reference systems in which the reference is transmitted on a separate RF frequency, using bandpass filters in the receiver to filter the reference signal from the bandspread message signal. Because there is no need for a second code generator in the receiver there is no need for any code clock, and code phase synchronization between the two code generators and the acquisition of the message is thus facilitated. However, separating the reference in frequency from the reference modulated message nullifies any potential capability to compensate for frequency selective fades and dispersion effects. Moreover, use of a modulated carrier in such transmitted reference systems still requires a locally regenerated replica of the carrier.

In I-Q transmission schemes, the carrier comprises two orthogonal basis vectors, with a 90 degree ($\pi/2$) phase difference, such as $\sin(\theta)$ and $\cos(\theta)$. These two basis vectors meet the criteria of orthogonality and normality, since $$\int_{-\pi}^{\pi} \sin(\theta)\cos(\theta)d\theta = 0$$

and $\sin^2(\theta)+\cos^2(\theta)=1$. A linear combination of these two basis vectors will create an arbitrary vector in the space of signals. If the modulation changes the sign of the magnitude of the basis vector at data transitions, such a system is called "quadrature phase shift keying", or QPSK. If the system is constrained so that the data transitions applied to each basis vector do not occur at the same time, such a system is called "offset-QPSK". If the timing of the transitions is further constrained, as is typically done, so that the transitions on one basis vector occur at the mid-bit time of the data on the other basis vector, such a system is called "$\pi/2$-offset QPSK".

Figure 1:
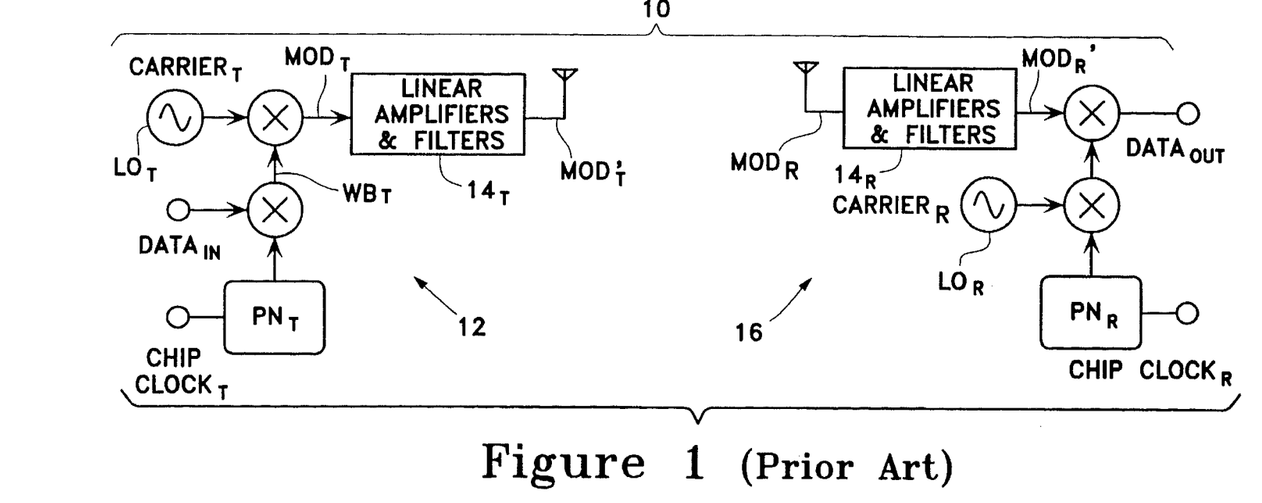
FIG. 1 is a simplified representation of a prior art spread spectrum transmission and reception system.

FIG. 1 is a simplified representation of a generic prior art spread spectrum transmission and reception system 10. A carrier signal CARRIER$_T$ is modulated in the transmitter section 12 with a wideband signal WB$_T$ which is composed of pseudo noise PN$_T$ convolved with low rate data signal DATA$_{IN}$. The resultant modulated carrier signal MOD$_T$ is fed to a linear amplifier and flat phase filters 14$_T$ and transmitted. In the receiver section 16, similar linear amplification and filtering 14$_R$ is applied to the received modulated carrier signal MOD$_R$ and the received data DATA$_{OUT}$ is recovered by convolving the filtered received modulated carrier signal MOD$_R$' with a local carrier CARRIER$_R$ which has been made phase coherent with the transmitter carrier CARRIER$_T$, and with a local replica PN$_R$ of the original pseudo noise signal PN$_T$, which has been code aligned and made coherent with the transmitter chip clock CHIP CLOCK$_T$. In principle, the processes in the receiver 16 need not be performed in any particular order—the pseudo noise PN$_R$ may be used to modulate the output of the receiver local oscillator LO which then is convolved with the incoming signal, or the pseudo noise PN$_R$ may direct multiply the incoming signal either before (MOD$_R$'), or after (not shown) the signal has been mixed with the local carrier CARRIER$_R$.

Figure 2:
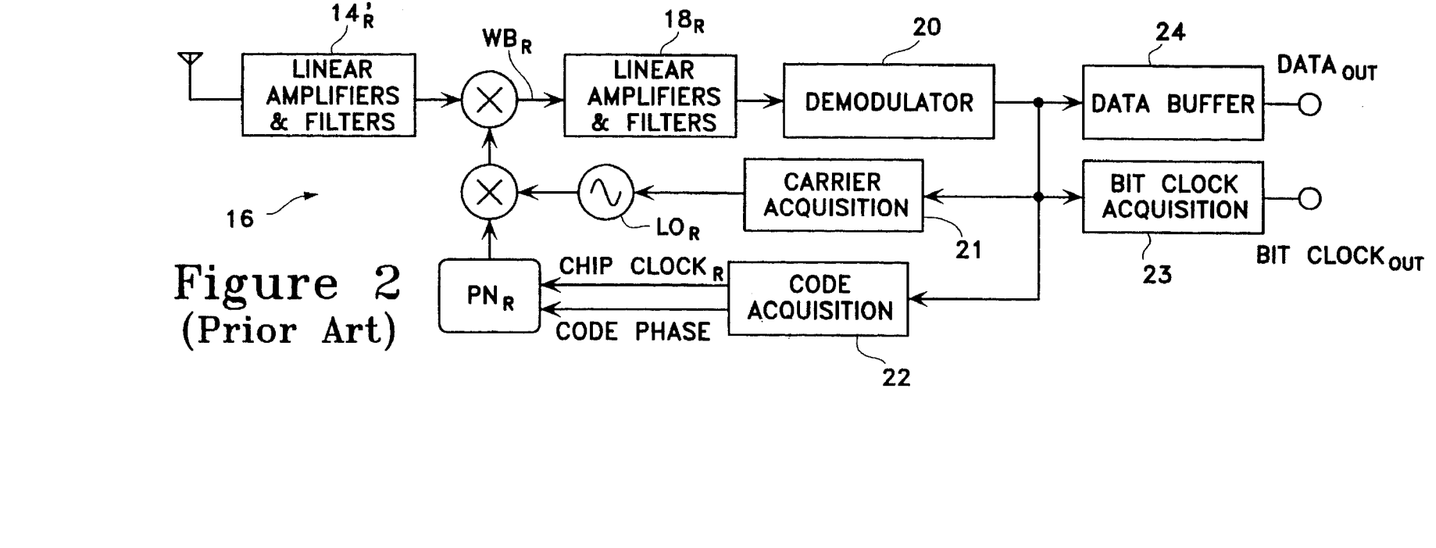
FIG. 2 shows a prior art spread spectrum receiver.

FIG. 2 is a block diagram of a typical prior art spread spectrum receiver 16, showing various subsystems associated with carrier frequency and phase acquisition 21, code clock and phase acquisition 22, data bit clock synchronization 23, and data output 24.

Figure 3:
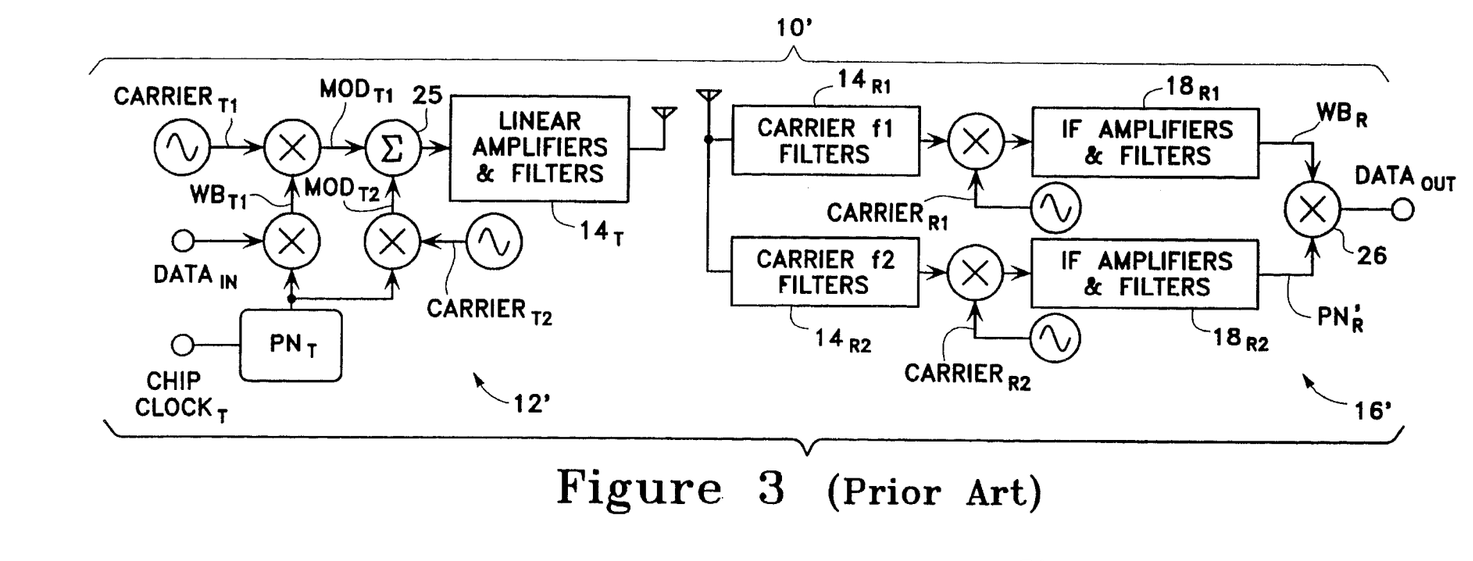
FIG. 3 is a simplified representation of a prior art transmitted reference spread spectrum system.

FIG. 3 is a simplified representation of a typical prior art "transmitted reference" spread spectrum system 10', in which the PN code is sent on a separate carrier frequency $CARRIER_{T2}$, from the carrier frequency $CARRIER_{T1}$ used to transmit the PN coded message ($WB_{T1}$). In such a system, the transmitter 12' sends RF signals ($MOD_{T1}$, $MOD_{T2}$) out on two frequencies (f1, f2), and it is important to maintain good linearity from the time the two RF signals $MOD_{T1}$, $MOD_{T2}$ are added (summer 25) until they are convolved (mixer 26) in the receiver 16'. This means that all the transmitter and receiver amplifiers and filters ($14_{T1}$, $14_{T2}$, $14_{R1}$, $14_{R2}$, $18_{R1}$, $18_{R2}$) must have good linearity and high dynamic range. Furthermore, while not explicitly shown in FIG. 3, the prior art dual frequency transmitted reference receiver 16' must be provided with all of the carrier acquisition circuitry (21) required to generate two local carriers ($CARRIER_{R1}$, $CARRIER_{R2}$), each locked in phase with a respective RF signal carrier, thereby potentially doubling the carrier acquisition circuitry associated with the single local carrier in the receiver of FIG. 2. The code clock and code phase acquisition circuitry is avoided, however, due to the use of a "transmitted reference" pseudo noise signal $PN_R'$ rather than having to synchronize a local pseudo noise generator to produce a replica $PN_R$ (FIG. 2) of the original pseudo noise signal $PN_T$.

The carrier acquisition circuitry required in the receiver of prior art spread spectrum systems not only adds to the expense and complexity of the receiver, but also requires a relatively long interval at the start of transmission for carrier acquisition before any information can be received, and is prone to error if the carrier is subject to rapid changes in frequency because of signal path induced frequency errors and/or Doppler effects. Moreover, because the reference signal and the encoded message were not subjected in prior art spread spectrum transmission schemes to identical signal path distortion effects, any signal path distortion effects had to be filtered out in the receiver prior to using the undistorted reference to de-convolve the original message from the undistorted encoded message. Accordingly, such prior art transmitted reference systems were not suitable for particularly wideband applications having a high chipping rate which is a substantial fraction (at least 10%) of the carrier frequency. In that regard, it is noted that two non-overlapping spread spectrum signals that together occupy a substantial portion of the LF (100 kHz to 2 MHz), HF (2 MHz to 30 MHz), or VHF (30 MHz to 200 MHz) region will be subject to significantly different multipath effects.

DISCLOSURE OF INVENTION

In accordance with the broader aspects of the invention, the noise spread message is placed on one or more orthogonal basis vectors (eg, the two sinusoidal signals of a phase quadrature transmission), with the sum total of all such basis vectors comprising a carrier signal which is used to propagate the message through a channel from transmitter to receiver.

An overall object of one aspect of the invention is to provide a spread spectrum transmission system which can be readily implemented at a relatively low cost. Related, but more specific objects are to provide a spread spectrum system which makes effective use of the available transmission bandwidth; to provide a spread spectrum system which provides fast acquisition of the message signal that is particularly suitable for short packets of information; to provide a spread spectrum system which does not require regeneration at the receiver of a phase coherent local replica of the transmitted carrier; to provide a spread spectrum system which does not require resolution of ambiguity between the in-phase and quadrature-phase channels in the receiver; and to provide a spread spectrum system which does not exhibit data phase ambiguity. Potential applications for such readily implementable, low cost spread spectrum systems include RF modems for computer-to-peripheral device(s) and computer-to-computer communications, automobile alarms, RF activated light switches and the like.

Objects of other aspects of the invention are to provide a spread spectrum system in which multipath reflections add signal power to the re-correlated message; and to provide a spread spectrum system which is relatively immune to the effects of highly dispersive and distorting propagation media such as conventional telephone lines, ionizing gases in the atmosphere, and complex electromagnetic environments such as the interiors of buildings. Other related objects are to provide wideband spread spectrum systems suitable for use in the LF (100 KHz to 2 MHz), HF (2 MHz to 30 MHz), and VHF (30 MHz to 200 MHz) regions using a chipping rate which is a substantial fraction (greater than 10%) of the carrier frequency, that is relatively immune to the frequency dependent multipath distortion that inevitably occurs in such situations; and to provide spread spectrum systems wherein such a wideband signal may be propagated through uncompensated channel filters and signal processing elements such as non-linear amplifiers, limiting amplifiers and dispersive filters and delay lines.

Other related but more specific objects are to provide a spread spectrum system whose signal can be generated with severe band-limiting without substantial loss of re-correlation gain, to provide a spread spectrum system which permits "frequency division multiple access" ("FDMA") to be implemented on channel frequency spacings which may be only a fraction of the chipping rate, and to provide a spread spectrum system which is tolerant to relatively large frequency offset between transmitter and receiver. Such offsets occur for example due to movement between transmitter and receiver, and due to low cost frequency determining elements.

It is an object of yet another aspect of the invention to provide a spread spectrum system which uses simple delay coding to permit shared use of a single carrier frequency.

Other specific objects of yet other aspects of the invention are to provide spread spectrum systems which permit high speed re-channeling without synchronization, and/or which permit a partial channel response receiver to characterize the signal path while simultaneously processing the received message, and without requiring cooperation from the transmitter.

These and other related objects are satisfied by an improved spread spectrum transmission system in which the output of a pseudo-random noise generator or other wideband reference signal is combined (convolved) with a narrowband message signal to form an encoded spread spectrum signal which is then used to modulate a first basis vector of the carrier signal and in which a possibly time-shifted version of the reference signal is used to modulate a second basis vector of the carrier orthogonal to the first basis vector. The thus-modulated basis vectors are summed to form a single spread spectrum signal incorporating both an encoded message and a transmitted reference in which the two received basis vectors (possibly with a complementary timeshift) may be combined and the original narrowband message recorrelated, with both basis vectors having the same carrier frequency and thus subject to the same propagation effects. There is nothing about the transmitted spectrum which prevents use of coherent demodulation techniques; however, in a preferred embodiment, the two basis vectors correspond to the I and Q channels of a conventional π/2-offset phase quadrature transmission system, the reference signal is delayed by an integral multiple of the chipping period, and two orthogonal outputs of a conventional I-Q demodulator are each convolved (multiplied) with a similarly delayed copy of the other output, which are then combined to form a balanced decoder output that is relatively insensitive to changes in carrier frequency and that does not require the demodulator to be locked in phase or frequency to the carrier and/or to distinguish between the two orthogonal components, thereby facilitating asynchronous demodulation and essentially instantaneous re-correlation at the receiver and at the same time providing inherent compensation for frequency offset and multipath channel dispersion effects.

BEST MODE FOR CARRYING OUT THE INVENTION

Figure 4:
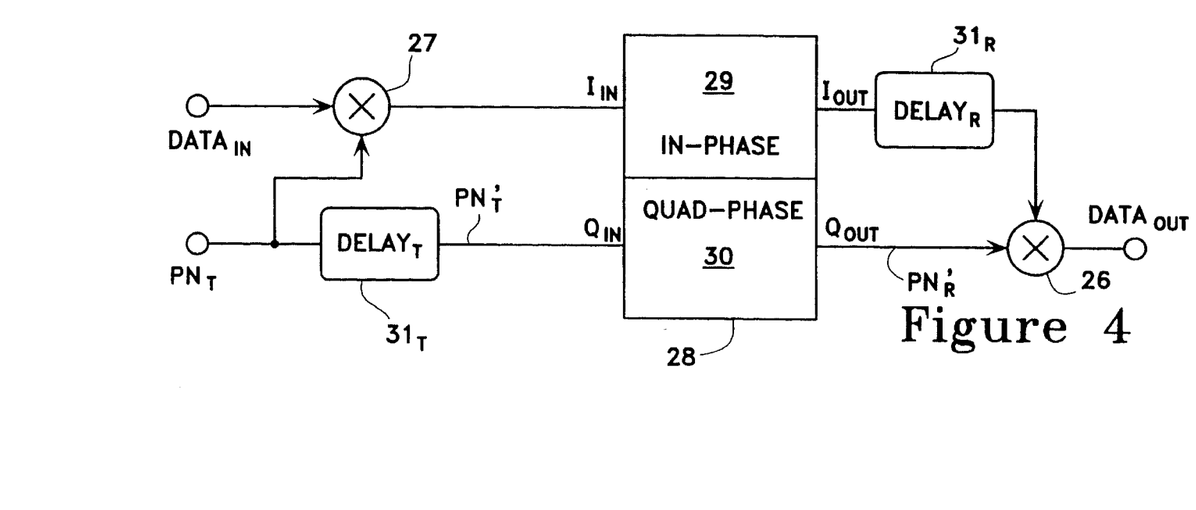
FIG. 4 shows a simplified representation of a communications channel utilizing the present invention.

FIG. 4 shows a simplified embodiment of a communications system utilizing the present invention. The data $DATA_{IN}$ is convolved (multiplier 27) with the PN pseudo noise source $PN_T$, in a conventional manner, as discussed previously with respect to FIGS. 1 and 3, and used to modulate one input basis vector $I_{IN}$ of a conventional communications channel 28 having at least two orthogonal basis vectors (eg, the two sinusoidal signals of a phase quadrature transmission system having an in-phase component 29 and a quadrature-phase component 30). The noise source $PN_T$ is encoded by a $DELAY_T$ (which may take on any value, positive, negative, or zero), for example by means of a shift register $31_T$, and the delay encoded reference signal $PN_T'$ is used to modulate another input basis vector $Q_{IN}$ of communications channel 28. It will be apparent to those skilled in the art that instead of (or in addition to) subjecting the reference code branch of a transmitted reference spread system modulator to a predetermined time shift, other modes of delay encoding that will result in the desired orthogonal modulated basis vectors include convolving the data in the encoded message branch with a delayed replica of the reference code (FIG. 11), delaying the encoded message (see FIG. 8), and/or using a conventional n-stage differential encoder (not shown) to precode the reference code in one of the branches and/or to precode the encoded message with a predetermined delay. When cost considerations are not paramount, using a differential encoder and/or encoding both the reference code input to convolver 27 and its encoded message output may provide a significant improvement in performance. Moreover, using a data clock to reverse the delayed and non-delayed versions of the reference signal produces a "balanced" modulation scheme from which the data clock may be readily recovered (see FIGS. 13 and 14).

The first received modulated basis vector $I_{OUT}$ from communications channel 28 corresponding to the first input basis vector $I_{IN}$ is encoded (shift register $31_R$) by a delay $DELAY_R$ which corresponds to the transmitter delay $DELAY_T$ and fed to one input of convolver 26, while the second basis vector output $Q_{OUT}$ is directly fed to the other input of convolver 26. Since the two inputs to the convolver have both been subjected to the same delay (one in transmitter shift register $31_T$, the other in receiver shift register $31_R$), the wideband coded message $WB_R$ is effectively coded a second time with a coherent replica $PN_R$ of the original pseudo noise signal $PN_T$ and is thereby restored ($DATA_{OUT}$) to the original narrowband $DATA_{IN}$. As is conventional in synchronous phase quadrature receivers, this simplified embodiment requires carrier acquisition means (not shown) for generating a locally phase coherent replica of the transmitter carrier $CARRIER_T$.

Figure 5:
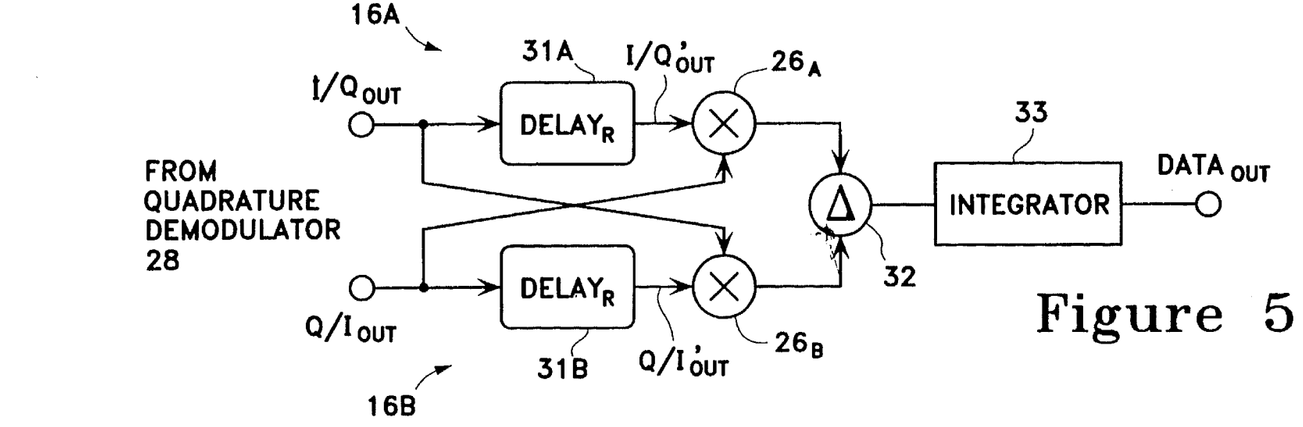
FIG. 5 shows an improved demodulator embodying various specific aspects of the invention, in which a coding delay is placed on the PN source, thus permitting true asynchronous operation and inherent compensation for frequency offsets between the transmitter and the receiver.

FIG. 5 shows an asynchronous demodulator embodiment of the present invention, which removes the requirement for regenerating a local phase coherent replica of the transmitter carrier when a coding delay is placed on the PN source, thus permitting true asynchronous operation and eliminating the time loss and complexities inherent in carrier acquisition. Moreover, this novel demodulator topology provides data recovery for all incoming phase positions of the carrier, and in particular for phase positions which change during transmission due to frequency offsets between the transmitter and the receiver. Such asynchronous demodulation requires that the two basis vectors be encoded with different delays that provide two mutually orthogonal encoded basis vectors, for example, by a time shift of half the PN chip clock period and a time-shift equal to several PN chip clock periods. It should be understood that although the delay coding may be conveniently provided by a digital shift register clocked by the same chip clock used to encode the data with the pseudo noise signal, it may be generated by any means, analog, digital, or a combination of both, provided that the resultant encoded basis vectors are mutually orthogonal. As illustrated, the asynchronous demodulator has two cross coupled processing paths 16A, 16B each combining (convolvers 26A, 26B) a respective one of the two received modulated basis vectors $I/Q_{OUT}$, $Q/I_R$ with a delayed replica $Q/I_{OUT}'$, $I/Q_{OUT}'$ of the other received modulated basis vector, with the same delay $DELAY_R$, which are then combined (subtractor 32), and integrated (integrator 33). It will be apparent to those skilled in the art that if the original phase relationship between the two vectors is preserved ($I_{OUT}=I_{IN}$ and $Q_{OUT}=Q_{IN}$), then the output from the first processing path 16A will be a narrowband signal identical to $DATA_{OUT}$ of the simplified embodiment of FIG. 4, while the output of the second processing path 16B will be recoded with an out of phase copy of the original pseudo noise signal and will thus remain a wideband coded signal which (because of the pseudo random nature of the code) will have no DC content. Similarly, if the two output basis vectors are out of phase by exactly $\pi/2$ relative to the two respective input basis vectors ($I_{OUT}=-Q_{IN}$ and $Q_{OUT}=I_{IN}$), then the output from the second processing path 16B will be a narrowband signal identical to $-DATA_{OUT}$ of the simplified embodiment of FIG. 4, while the output of the first processing path 16B will be recoded with an out of phase copy of the original pseudo noise signal and will thus remain a wideband coded signal which (because of the pseudo random nature of the code) will have no DC content. It should also be apparent that if the two output basis vectors are out of phase from the two respective input basis vectors by an intermediate value, then each processing branch will output a signal that has a narrowband DATA component and a pseudo random wideband WB component. As a practical matter, if no carrier lock is provided, there will be a rolling phase relationship between the input vectors and the output vectors and the respective outputs from each processing path will vary between pure data and pure noise; however by combining (eg, differencing) the outputs from the two cross-coupled processing paths, the output will always have a baseband signal component corresponding to the original data $DATA_{IN}$. This embodiment has a maximum achievable output signal-to-noise ratio (SNR) proportional to the coding gain of the spread spectrum system, due to the contributions of the code cross products (the above-mentioned pseudo random WB components) on one or both of the two processing branches 16A, 16B, which may be eliminated from one of the branches if carrier lock is provided. Alternatively, even without carrier lock, the cross code noise may be significantly reduced if the differencing circuit 32 is replaced by a decision circuit which determines which processing branch (16A, 16B) has the greater signal (the better signal to noise ratio), and chooses that branch, and/or by using an appropriate out-of-band noise detector on each branch.

Figure 6:
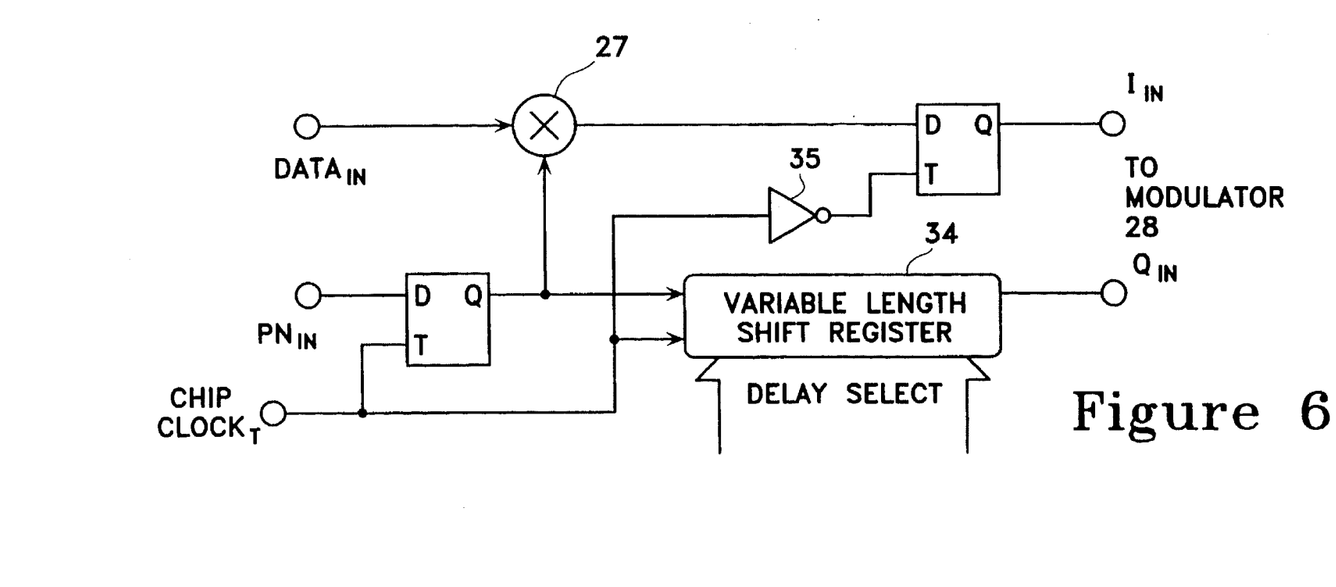
FIG. 6 is a simplified diagram of a modulator embodying various specific aspects of the invention, which provides a programmable delay in the reference channel, and a furthers ½ chip offset between the I and the Q channels.

FIG. 6 is a simplified diagram of a spread spectrum modulator incorporating other aspects of the invention, showing the addition of a programmable delay 34 in the reference channel, and a further ½ chip offset (invertor 35) between the I and the Q channels. The programmable delay permits "delay division" multiplexing, and the ½ chip offset provides constant envelope modulation capability, so that non-linear amplifiers (class C power amplifiers) and limiters may be used without degrading performance. In an exemplary embodiment, the chipping rate was 6.4 MHz, the data rate was 100 kHz, and the code generator was a Gold/JPL code generator in which the outputs from two feedback registers of respective lengths 17 and 19 were exclusive ORed to realize a code repeat length of 2.8 hours. The multiplexing capability is due to the fact that the receiver correlator will only regenerate data from a signal with a matching delay; other delays produce only code rate noise terms. Thus, by providing a different specific delay for each receiver, one transmitter may communicate sequentially to more than one receiver and several transmitters may communicate simultaneously with different respective receivers. Alternatively, (as indicated schematically by the dashed line in FIG. 8) the modulation process may be cascaded at the transmitter with the combined message and reference from one stage being used as the reference signal in the next stage (indicated schematically by the dashed line), such that a single transmitter may simultaneously send several coded messages, each encoded with a different delay, to one or more receivers.

Figure 7:
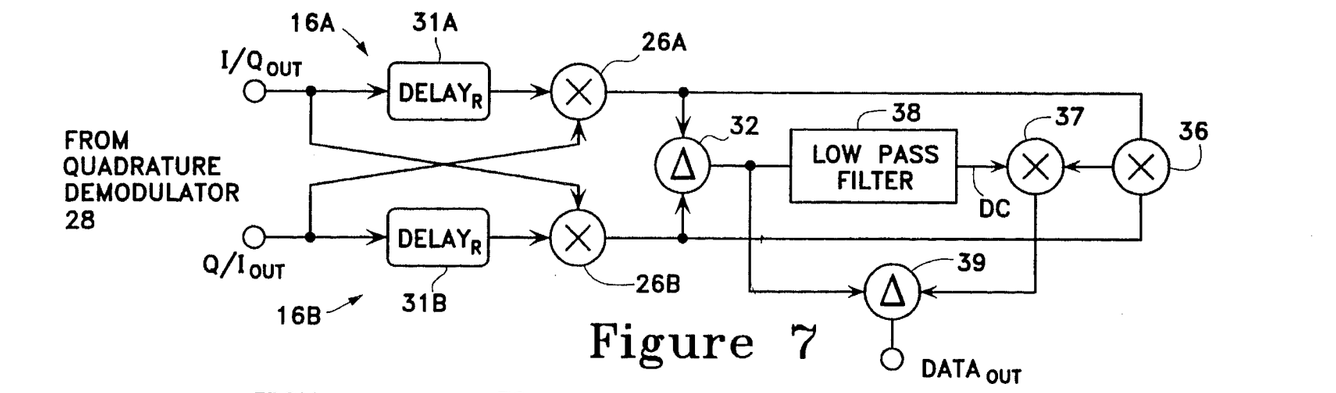
FIG. 7 is a simplified drawing of an augmented asynchronous demodulator embodying various aspects of the present invention, wherein cross coupled code noise is eliminated by re-modulation and subtraction.

FIG. 7 is a simplified drawing of one embodiment of an augmented asynchronous demodulator, wherein any cross coupled code noise present simultaneously on both signal paths is output from convolver 36 and is re-modulated by convolver 37 with the DC signal component (from low pass filter 38) and subtracted (subtractor 39) from the output of subtractor 32, and thus effectively eliminated from the output $DATA_{OUT}$.

Figure 8:
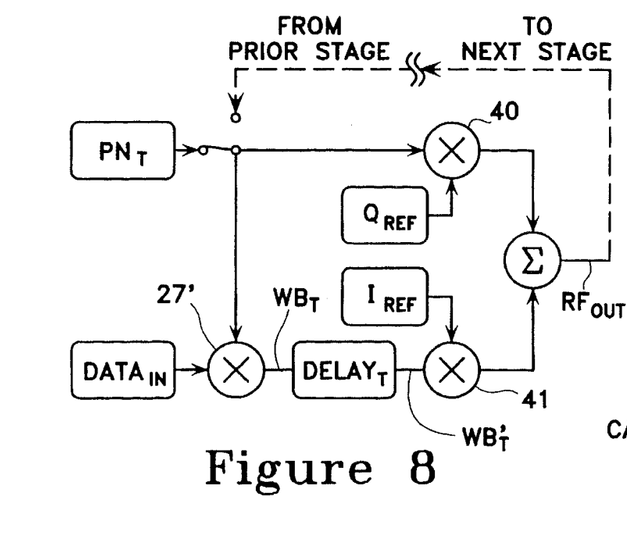
FIG. 8 is a simplified drawing of a generalized vector modulator suitable for use with various embodiments of the present invention.

FIG. 8 is a simplified drawing of a generalized vector modulator for use with various embodiments of the spread spectrum system of the present invention. The broadband noise source $PN_T$ is unconstrained except that it is desirable that its flat power bandwidth be no less than the desired spread transmitter bandwidth. The narrowband message $DATA_{IN}$ has a bandwidth less than $PN_T$. The coding delay $DELAY_T$ separates the noise source signal $PN_T$ in time from the wideband coded message signal $WB_T$, which is the broadband noise source $PN_T$ convolved with the narrowband message $DATA_{IN}$ and which is delayed to form delayed coded message $WB_T'$. The reference signal $PN_T$ is also convolved (mixer 40) with a first unmodulated carrier basis vector $Q_{REF}$, and the delayed coded message signal $WB_T'$ is convolved (mixer 41) with a second unmodulated carrier basis vector $I_{REF}$, and the output of these two processes are summed to produce a modulated carrier signal $RF_{OUT}$, which is placed by a conventional process on a communications channel. The two carrier input basis vectors $Q_{REF}$ and $I_{REF}$ are orthonormal, as described earlier. Although only one pseudo random message coding basis vector ($PN_T$) is shown, more than one may be used, as with the cascaded modulation variants shown in dashed line and described earlier with respect to FIG. 6.

Figure 9:
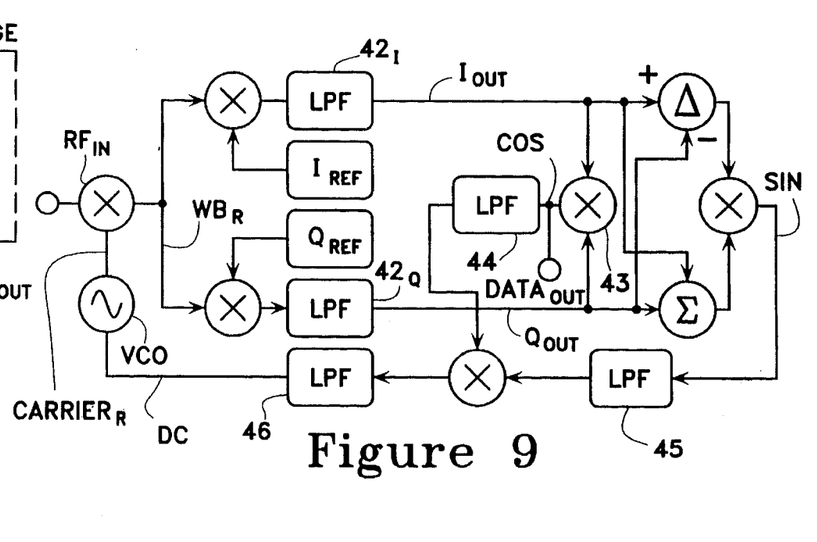
FIG. 9 shows a generalized carrier phase recovery loop suitable for use with various embodiments of the present invention.

FIG. 9 shows a generalized carrier phase recovery loop in the context of a zero delay synchronous embodiment of the present invention, which may be readily modified for use in synchronous delay division transmission systems. A true phase lock is obtained, with the phase detector having a fourth order response to carrier phase error (a ¼ Hz error produces a 1 Hz beat note), and the modulation terms on each basis vector are squared, so that no ambiguity exists in the lock points. An advantage of this implementation is that it does not require direct squaring of any input, and the cancellation of the unwanted terms is mathematically exact. The incoming signal $RF_{IN}$ is mixed with a local carrier signal $CARRIER_R$ from a voltage controlled oscillator VCO to form a wideband signal $WB_R$, and is then split into two phase quadrature modulation components $I_{OUT}$ and $Q_{OUT}$ (which are generated in conventional fashion by two orthogonal signals $REF_I$ and $REF_Q$ preferably but not necessarily having a fixed frequency independent of the local carrier $CARRIER_R$), which in turn pass through two respective lowpass filters ($42_I$ and $42_Q$) which have a cut-off frequency less than or equal to the carrier frequency and are then recorrelated (mixer 43) to form a first signal COS which is proportional to the cross product of the two modulation components times the cosine of the phase error (which in the absence of any delay coding and with a phase error approximately zero, will provide the recorrelated data output $DATA_{OUT}$); the second signal SIN is proportional to the cross product of the two modulation components times the sine of the phase error. The lowpass filter 44 associated with the cosine component COS and the lowpass filter 45 associated with the sine component SIN are also at the carrier frequency, and may not be required. The lowpass filter 46 is set to ¼ the code rate and passes the DC component DC of the product of the COS signal with the SIN signal. Since the product of the COS signal with the SIN signal is proportional to the squared cross product times the sine of twice the phase error, its DC component DC accurately reflects both the sign and the magnitude of the cross product noise and may thus be used as a control input to the voltage controlled oscillator VCO which functions as the local carrier source. This produces a very fast carrier acquisition loop when the code rate is high. It will be apparent to those skilled in the art that a similar phase control loop could be used to provide a phase coherent local replica of the transmitter carrier in a synchronous transmitted reference demodulator having a non-zero delay between the data and reference channels (in which case the data may be recovered from the two phase quadrature modulation components $I_{OUT}$ and $Q_{OUT}$ as described previously with respect to FIG. 4) and/or as a decision circuit to eliminate noise product terms from the generalized asynchronous demodulator shown in FIG. 5.

Figures 10, 11:
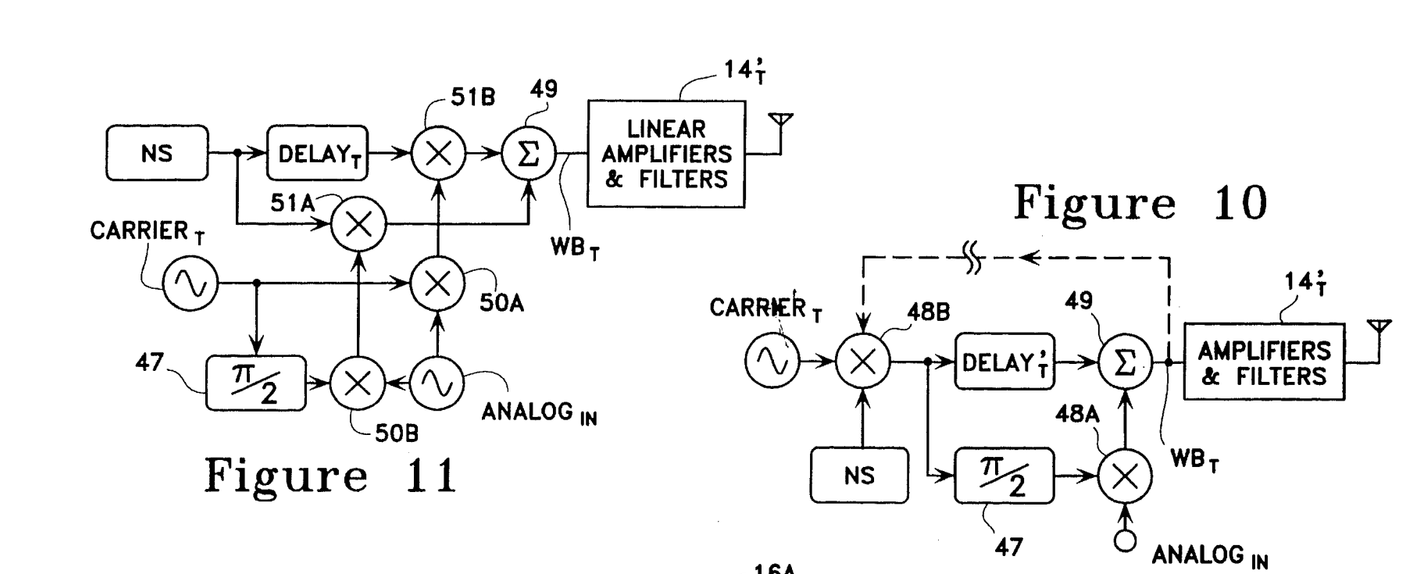
FIG. 10 shows an embodiment of the invention using an analog delay line in the modulator.
FIG. 11 shows an embodiment of the invention using analog modulation of band limited signals.

FIG. 10 shows an alternate implementation of a spread spectrum modulator in accordance with the present invention using an analog delay line $DELAY_T$', an analog noise source NS, a 90° phase shifter 47, two analog multipliers 48A, 48B, and a summing circuit 49, to produce a phase quadrature signal from a data signal $ANALOG_{IN}$ (which may be analog or digital) and an RF carrier signal $CARRIER_T$. The analog delay line $DELAY_T$' may be implemented, for example, with inductors and capacitors, coaxial lines, quartz resonators, surface acoustic wave devices, and the like. By using the modulated output $WB_T$ from one stage as the carrier $CARRIER_R$ for the next stage (as indicated by the dashed line), this topology is also suitable for cascading modulated signals, enabling a single transmitter RF path to be modulated simultaneously by more than one data signal $ANALOG_{IN}$, each encoded with a different delay.

FIG. 11 shows an alternate implementation of the present invention suitable for analog modulation of the message signals, in which both phases of the carrier $CARRIER_R$ are modulated (mixers 50A, 50B) with the analog data signal $ANALOG_{IN}$ before they are mixed respectively with undelayed (mixer 51A) and delayed (mixer 51B) versions of the noise source NS. This system is suitable for band limited signals, direct voice frequency modulation, and low frequency analog modulation. This modulator may be cascaded for transmitting more than one message Signal from a single transmitter, in a manner similar to that described previously.

Figure 12:
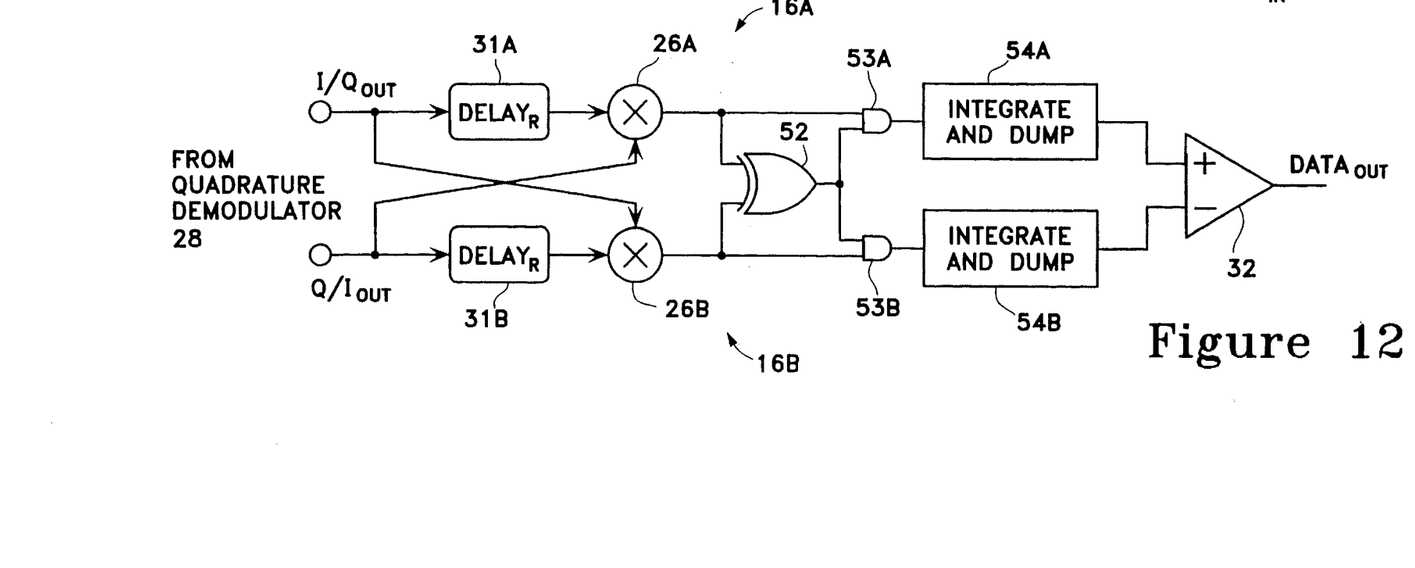
FIG. 12 illustrates the use of a digital differencing circuit to eliminate the code frequency terms from the output of an asynchronous, cross coupled quadrature demodulator.
Figure 17:
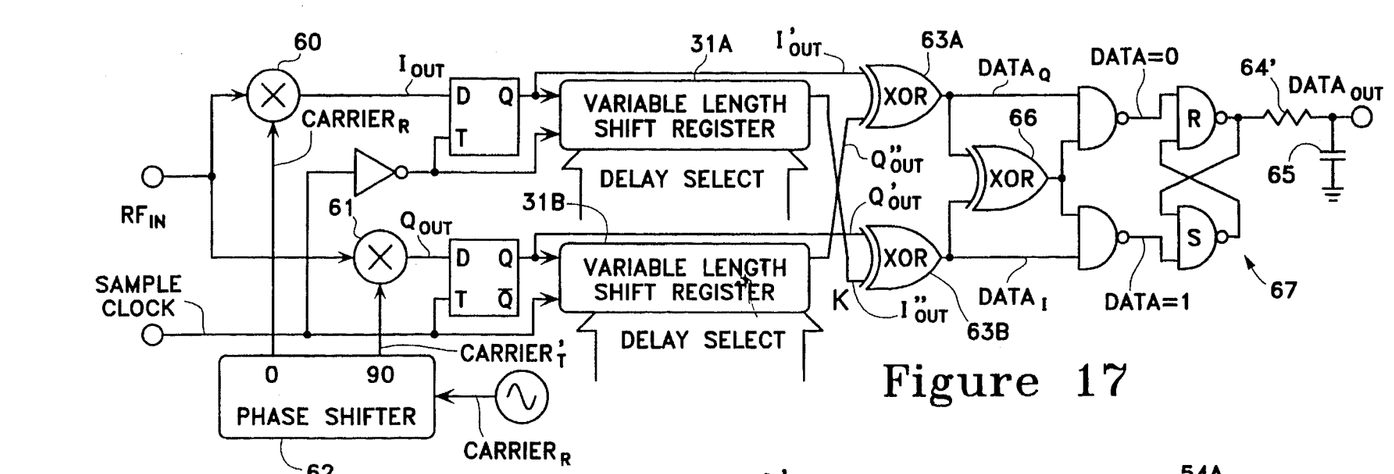
FIG. 17 indicates a first modification to the preferred embodiment of FIG. 16, which for extra cost and complexity achieves better bit error rate performance under high carrier-to-noise ratios.
Figure 18:
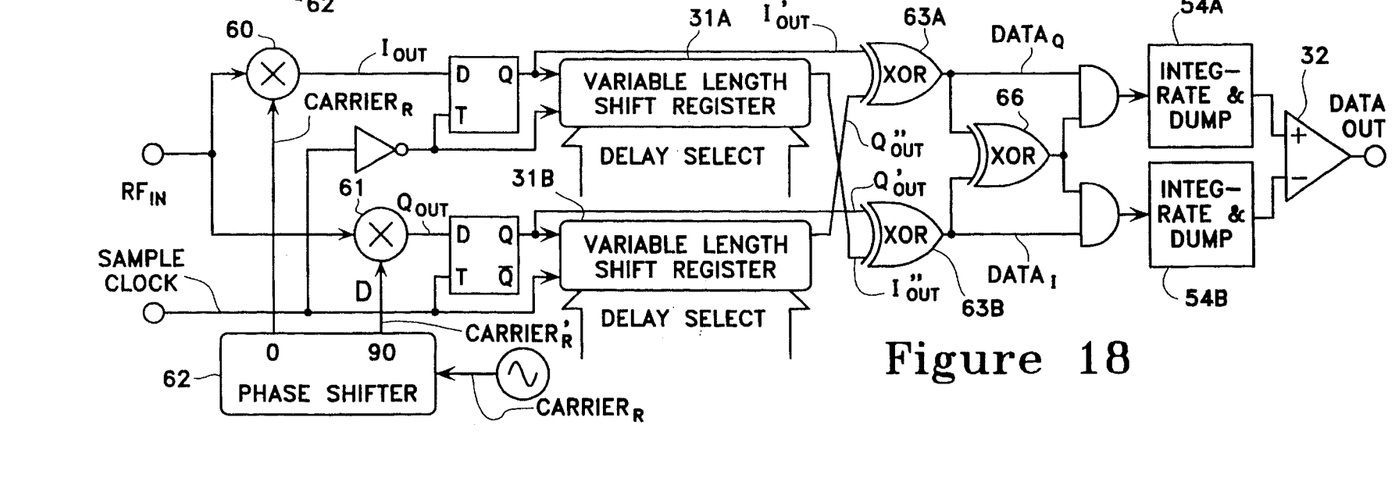
FIG. 18 indicates a second modification to the embodiments of FIGS. 16 and 17, which for further cost and complexity achieves even better bit error rate performance under high carrier-to-noise ratios.

For improved bit error rates in an asynchronous receiver, particularly when it is not feasible to further raise the chip-to-bit ratio, the circuitry shown in FIGS. 12, 17 or 18 may be used to further improve the signal-to-noise ratio.

FIG. 12 illustrates the use of a digital differencing circuit to eliminate the code frequency terms from the output of the previously described basic asynchronous, cross coupled quadrature demodulator. In this implementation, use is made of the fact that the data output from the differencing circuit 32 in FIG. 5 has three levels. When a data "1" is being transmitted, the output moves at the code rate between a middle value and a positive extremum. When a data "0" is being transmitted, the output moves between a middle value and a negative extremum. The positive or negative extremum corresponds to the data content of the narrowband decoded message signal, and the middle value in either case corresponds to agreement between the I path and the Q path (the cross coupled code noise), and has no information content. The exclusive OR 52 gates the output from the two cross coupled processing paths 16A, 16B to the respective inputs (via AND gates 53A, 53B) to two integrate and dump data filters 54A, 54B), so any middle value states due to cross coupled noise are eliminated. The integrate and dump detectors 54A, 54B then charge toward the appropriate value when data is valid, and hold the previous level when data is invalid. At the end of each integrate cycle, the data is read on both channels and compared, then the integrator is "dumped" and reset. "Integrate and dump" detectors are described in Shanmugam, K. Sam, *Digital and Analog Communications Systems,* John Wiley & Sons, 1979, pp. 390–393.

Figure 13:
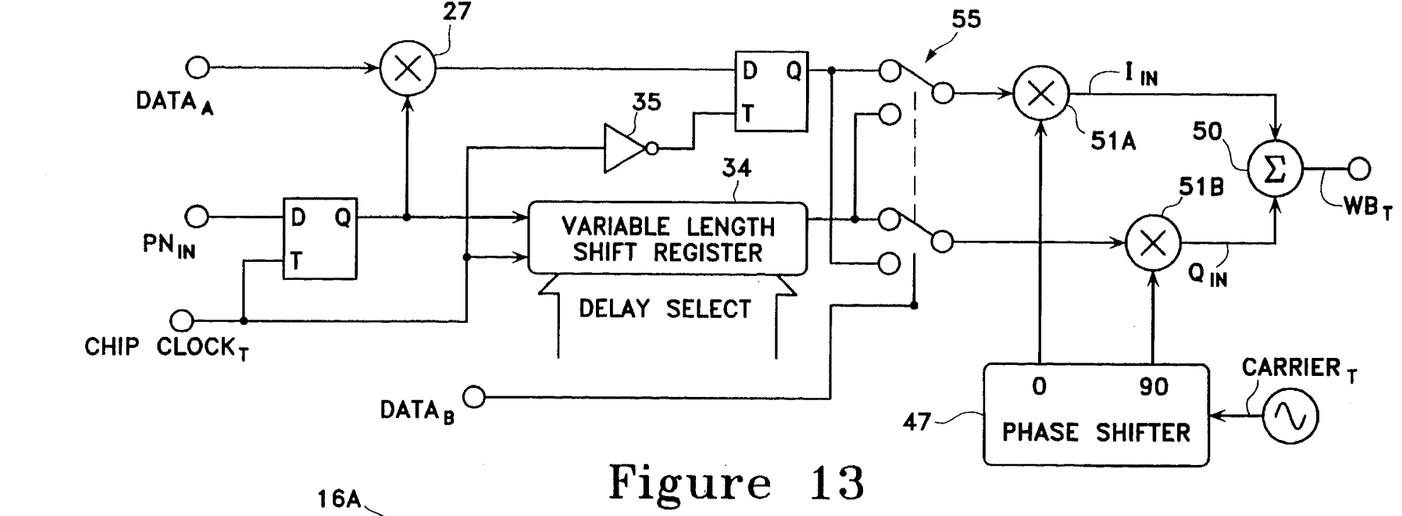
FIG. 13 is a simplified representation of a generalized "balanced" modulator constructed in accordance with the present invention.
Figure 14:
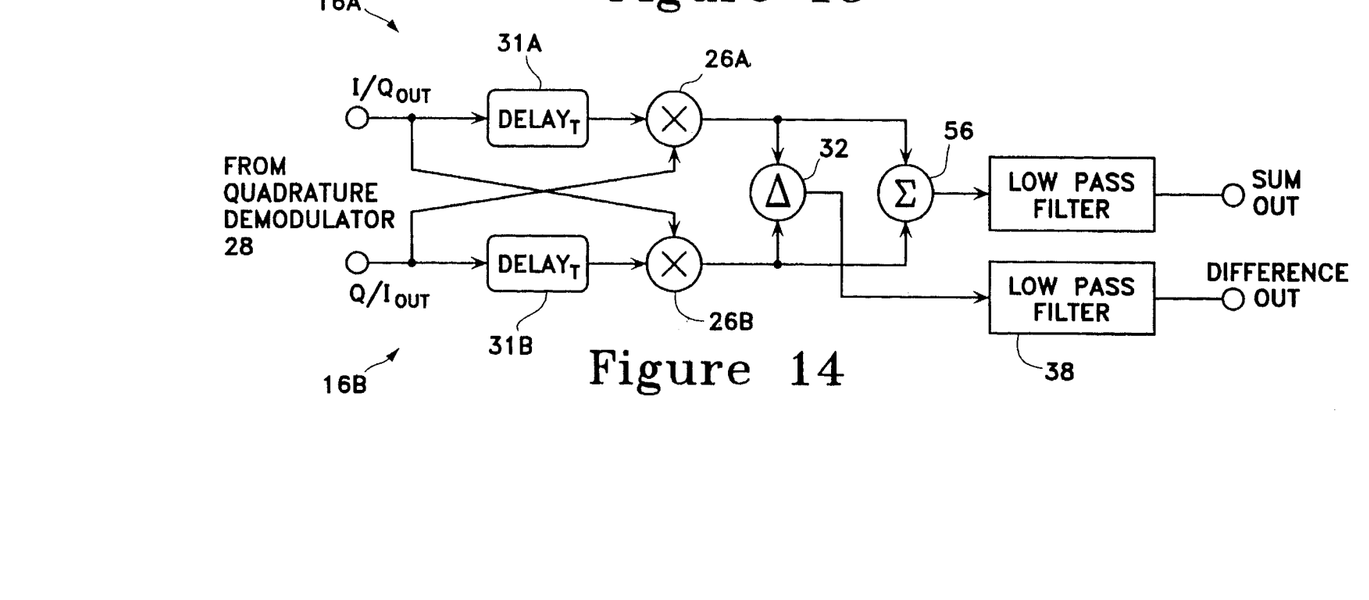
FIG. 14 is a simplified representation of a generalized demodulator constructed in accordance with the present invention, for use with the "balanced" modulator of FIG. 13.

For low cost switching functions and remote control systems, a "balanced" modulation implementation which permits CLOCK to be sent independent of the DATA channel is shown in FIGS. 13 and 14, using one of the modes cataloged in Table 1.

FIG. 13 is a simplified representation of a generalized "balanced" modulator embodiment of the present invention. This may be considered a fully digital combination of the encoding methods represented in FIGS. 6 (as to the function of the $DATA_A$ input) and 11 (as to the balanced function of the $DATA_B$ input). Note that rather than have the $DATA_B$ input control changeover switch 55, it could be multiplied with the signal on either branch $I_{IN}$ or $Q_{IN}$ by means of a suitable multiplier (not shown).

The generalized "balanced" modulator of FIG. 13 together with the complementary generalized demodulator shown in FIG. 14 will now be used to illustrate the modes of operation set forth in Table 1.

TABLE 1

PSI
PROBE Science, Inc.
Different QFAST Operating Modes (refer to FIGS. 13 and 14).

| MODE | INPUTS | Synchronous OUTPUTS | Asynchronous OUTPUTS |
|------|--------|---------------------|----------------------|
| 1 | Modulation | Modulation + PN | Modulation × Beat Note + PN |
|   | Data 0 | Modulation + PN | Modulation + PN |
| 2 | Modulation | Modulation + PN | Modulation × Beat Note + PN |
|   | Data 1 | $\overline{\text{Modulation} + \text{PN}}$ | $\overline{\text{Modulation} + \text{PN}}$ |
| 3 | Modulation | Modulation + PN | Modulation × Beat Note + PN |
|   | Clock | Manchester + PN | Manchester + PN |
| 4 | Modulation | Modulation + PN | Modulation × Beat Note + PN |
|   | Modulation | Data 0 + PN | Data 0 + PN |
| 5 | $\overline{\text{Modulation}}$ | Modulation + PN | Modulation × Beat Note + PN |
|   | Modulation | Data 1 + PN | Data 1 + PN |
| 6 | Clock | Clock + PN | Clock × Beat Note + PN |
|   | Modulation | Manchester + PN | Manchester + PN |
| 7 | Data 0 | Data 1 + $\overline{\text{PN}}$ | $\overline{\text{PN}}$ + Beat Note |
|   | Modulation | Modulation + PN | Modulation + PN |
| 8 | Data 1 | Data 0 + $\overline{\text{PN}}$ | $\overline{\text{PN}}$ + Beat Note |
|   | Modulation | Modulation + PN | Modulation + PN |

The resultant transmission system will thus include a transmitter (FIG. 13) with two inputs ($DATA_A$ and $DATA_B$) and a receiver (FIG. 14) with two outputs ($\Sigma$ and $\Delta$). Table 1 includes one input column and two output columns, SYNCHRONOUS and ASYNCHRONOUS, referring to carrier synchronization at the receiver. For each of the 8 modes, the first line of the corresponding entry in the Input column refers to the signal present at the $DATA_A$ input of FIG. 13, and the second line refers to the signal present at the $DATA_B$ input. Similarly, the first line of each entry in the Outputs column refers to the signal present at the SUM OUT output of FIG. 14, while the second line refers to the signal present at the DIFFERENCE OUT output. When a carrier locked loop is utilized in the receiver, the outputs will correspond to the SYNCHRONOUS column, and when no such carrier phase recovery scheme is employed, the output will correspond to the ASYNCHRONOUS column. With this Table, several features of the preferred modulation scheme may be illustrated. First, use of an asynchronous receiver will cause a beat note to appear in the receiver SUM channel, which is eliminated from the DIFFERENCE channel. This beat note is the frequency difference between the transmitter local carrier and the receiver local carrier. Second, the presence of the PN related noise on the output signal is additive, while the beat note (in the asynchronous case) is multiplicative. Third, using the input port to which "modulation" is attached as a phase reference, the SUM ($\Sigma$) signal from summer 56 contains an inverted form of the $DATA_A$ input, while the DIFFERENCE ($\Delta$) signal from subtractor 31 contains a signal which is the Exclusive-OR (XOR) of the $DATA_A$ and $DATA_B$ inputs. This feature permits the data clock to be sent directly. Since (CLOCK) XOR (DATA) = (MANCHESTER), and reciprocally:
(MANCHESTER) XOR (CLOCK) = (DATA), and
(MANCHESTER) XOR (DATA) = (CLOCK), modes 3 and 6 are both capable of recovering clock and data by a simple exclusive OR between the SUM and the DIFFERENCE channels. Such an arrangement permits data clock and data recovery essentially instantaneously. In the asynchronous mode 3, the product (XOR) of the SUM and DIFFERENCE contains the clock offset by the beat note, which can be utilized to provide carrier synchronization. If mode 3 is used and the $DATA_A$ input is given MANCHESTER, while the $DATA_B$ input is given CLOCK, the DIFFERENCE channel will have modulation and the SUM channel will contain MANCHESTER convolved with the beat note. Since MANCHESTER has no DC term, this mode will also be useful for carrier synchronization. In mode 6, if the $DATA_B$ input is given MANCHESTER and the $DATA_A$ input is given CLOCK, the DIFFERENCE output will again contain modulation, while the SUM channel will still contain the data clock offset by the carrier beat note. Again, since the CLOCK has no DC term (and is a single frequency signal) the SUM channel provides a signal for carrier lock.

In modes 7 and 8, the carrier offset beat note exists by itself, and provides a good input to a phase detector, permitting carrier acquisition loop with a second order response (1 Hz of error leads to a 2 Hz beat note) of $V_{phase} \propto A \cdot \sin^2(\theta_{error})$ instead of the more common fourth order response. The implication of this is a superior noise immunity in the carrier locking loop.

Figure 15:
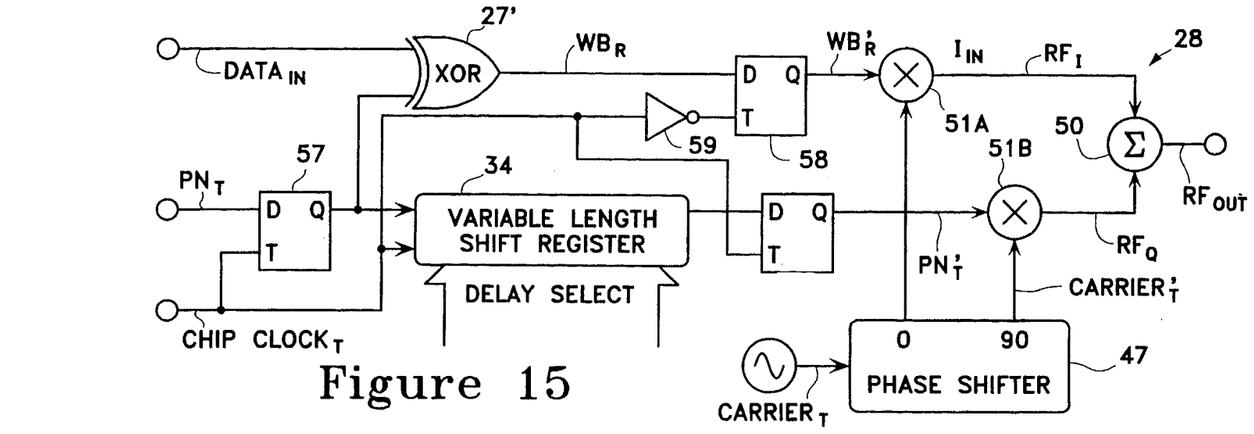
FIG. 15 shows a preferred embodiment of a modulator for use with the present invention.
Figure 16:
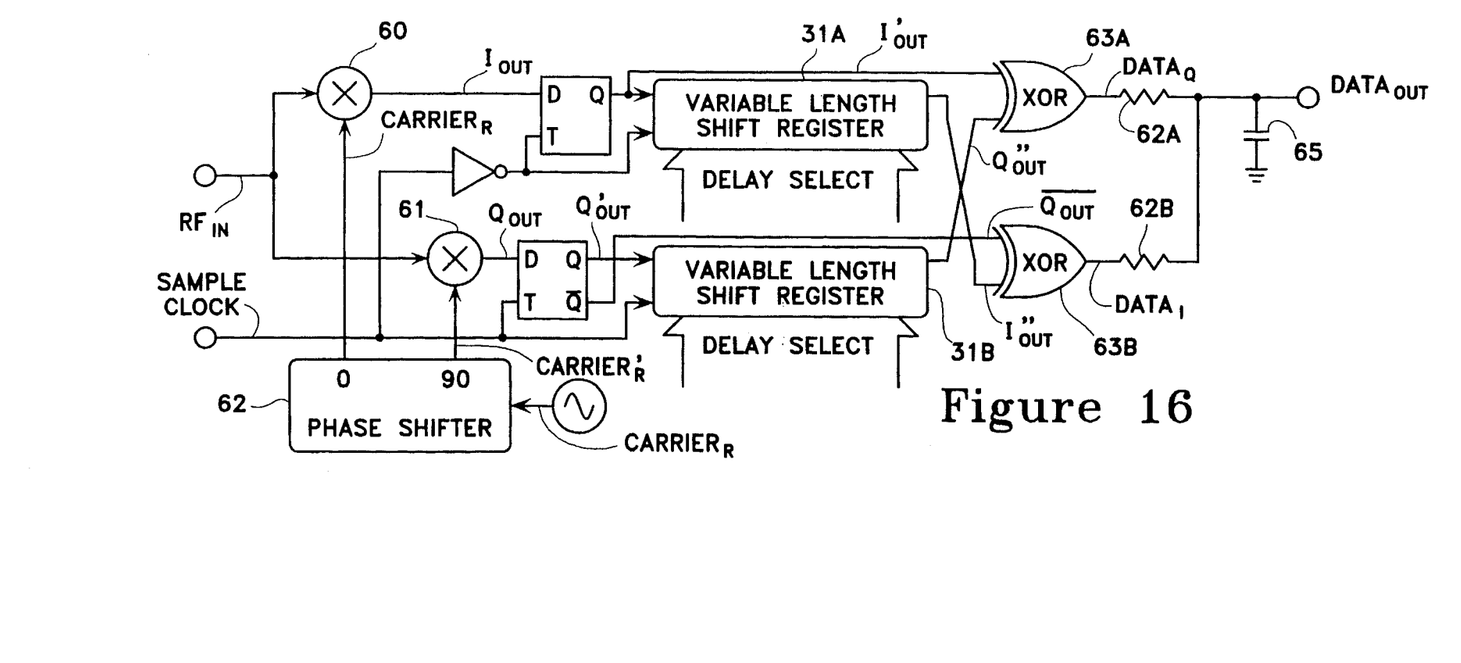
FIG. 16 shows a preferred embodiment of a demodulator for use with the present invention.

A system constructed in accordance with one presently preferred embodiment of the present invention consists of a transmitter using a coding delay of $$\frac{2n-1}{2}$$

periods of the chipping clock where n takes integer values from 1 up, a receiver with complementary coding delays and a cross-coupled asynchronous demodulator. The transmitter is implemented as shown in FIG. 15, and the receiver is implemented as shown in FIG. 16. This is a particularly simple and low cost version of the system, and is suitable for chip-to-bit ratios over 50, and bit error rates to $10^{-5}$. By simply restarting the PN sequence in synchronism with the data modulation the bit error rate performance may be improved, particularly if the start vector and code sequence is optimized (for example, by trial and error) for a given delay and C/B.

A transmitter modulator for such a preferred embodiment is illustrated in FIG. 15. The data $DATA_{IN}$ is mixed with a noise source clocked by flip-flop 57, which is derived either from a pseudo random generator or the amplified output of a thermal noise source. The mixing process may be implemented, for example, using a double balanced mixer, or as shown using an exclusive OR (XOR) logic gate 27'. The output of the mixing process $WB_R$ is clocked (flip flop 58) with one phase (invertor 59) of the chip clock (CHIP CLOCK), and provides one input $WB_R'$ to the quadrature modulator. The noise source $PN_R$ is clocked by the uninverted CHIP CLOCK$_T$ and delayed by digital shift register 34 (which may consist of cascaded digital flip flop registers). The delay may be varied by selecting the output from different stages, using for example, a switch. This delayed, clocked, noise source provides the second input $PN_T'$ to a quadrature modulator. The quadrature modulator may be a purchased entity, or may be implemented as shown, for example, using two double balanced mixers 51A, 51B, a summing network 50 (which may consist of resistors), and a phase shift network 47 capable of providing one of the mixers (eg, mixer 51B) with a local oscillator signal CARRIER$_T'$ shifted by approximately 90 degrees from the local oscillator signal CARRIER$_T$ applied to the second mixer 49. The two modulated basis vectors ($RF_I$ and $RF_Q$) output from the two mixers are summed (summer 50) to create the modulated carrier signal ($RF_{OUT}$). The modulated carrier frequency is chosen in accordance with the intended application, and the modulated carrier signal $RF_{OUT}$ may be placed on a conventional wired, or wireless (optical, acoustic, or electromagnetic) transmission link.

The receiver demodulator for that presently preferred embodiment will reverse the above-described modulation process, as shown in FIG. 16. The incoming modulated signal, $RF_{IN}$ is split into two quadrature channels $I_{OUT}$, $Q_{OUT}$ in the quadrature demodulator, which may be a purchased part, or implemented as shown, for example, with two mixers 60, 61 and a suitable phase shift network 62. The local carrier CARRIER$_R$ is split and phase delayed by phase shift network 62, so that two versions CARRIER$_R$ and CARRIER$_R'$ are available, separated by approximately 90 degrees. For purposes of this discussion, the CARRIER$_R$ signal shall be considered the in-phase local oscillator signal, and the CARRIER$_R'$ signal shall be considered the quadrature-phase local oscillator signal. The mixing of the input signal $RF_{IN}$ with the in-phase local oscillator CARRIER$_R$ produces an output I-channel $I_{OUT}$, and the mixing of the input signal $RF_{IN}$ with the quadrature-phase local oscillator CARRIER$_R'$ produces an output Q-channel $Q_{OUT}$. The signals $I_{OUT}$ and $Q_{OUT}$ are clocked with a local sample clock SAMPLE CLOCK whose frequency is at least twice (2×) that of the CHIP CLOCK$_T$, to satisfy the Nyquist sampling criteria. The re-clocked I-channel signal $I_{OUT}'$ is delayed using, for example, a digital shift register $31_A$, in a manner to match the delay used in the transmitter modulator, and produces the delayed signal $I_{OUT}''$. The re-clocked Q-channel signal $Q_{OUT}'$ is delayed using, for example, a digital shift register 31B, in a manner to match the delay used in the transmitter modulator, and produces the delayed signal $Q_{OUT}''$. The signals $I_{OUT}'$ and $Q_{OUT}''$ are mixed using analog mixers, or as shown for example, using an exclusive-OR 63A to produce the signal $DATA_Q$. The signal $\overline{Q_{OUT}'}$ which is an inverted form of the re-clocked Q-channel signal $Q_{OUT}'$ prior to the variable length shift-register 31B, and the signal $I_{OUT}''$ are mixed using analog mixers, or as shown for example, using an exclusive OR 63B to produce the signal $DATA_I$. A resistive SUM of $DATA_Q$ and $DATA_I$ produces a DIFFERENCE signal due to the use of the inverse of $Q_{OUT}''$. The resistive divider 64A, 64B also forms with capacitor 65, a lowpass filter which attenuates the code rate signal.

An enhanced version of the preferred receiver demodulator is shown in FIG. 17, which for extra cost and complexity achieves better bit error rate performance under high carrier-to-noise ratios. The signal $Q_{OUT}''$ is not inverted, as was done in the preferred embodiment, so that the signal $\overline{DATA_I}$ is formed from the delayed signal $I_{OUT}''$ and the non delayed, non inverted signal $Q_{OUT}'$. An exclusive OR (gate 66) of signals and is used to gate signal $DATA_Q$ to produce signal DATA=0 and to gate signal $\overline{DATA_I}$ to produce signal DATA=1. When the signals at $DATA_Q$ and $\overline{DATA_I}$ are in agreement, and the data is a data "1" signal DATA=0 is high and pulses low at the chipping rate, while signal DATA=1 remains high. When the signals at $DATA_Q$ and $\overline{DATA_I}$ are in agreement and the data is a data "0", the signal DATA=0 remains high and the signal DATA=1 is high and pulses low at the chipping rate. The signals DATA=1 and DATA=0 are routed to the set S and reset R inputs of a set/reset flip flop 67 which converts the two signals DATA=1, DATA=0 to a serial data stream $DATA_{OUT}$, devoid of the chipping rate pulses. Lowpass filtering (not shown) in the feedback path of the R/S flip flop 64 may improve the noise handling capability, and the RC lowpass filter provided by resister 62' and capacitor 63 removes any high frequency digital artifacts from the signal.

FIG. 18 indicates yet another enhancement of the preferred embodiment, which for further cost and complexity achieves better bit error rate performance under high carrier-to-noise ratios than the embodiments of FIG. 16 and FIG. 17. Such an enhanced receiver demodulator extends the noise handling capability of the demodulator by replacing the simple R/S flip flop 67 and RC filter 64', 65 of FIG. 17 with integrate and dump detectors 54A, 54B on each of the two data paths, prior to making a DATA=1 or DATA=0 decision. The integrate and dump detectors 54A, 54B may be implemented using either a digital, an analog, or a mixed approach. The outputs of the integrate and dump data filters are compared (subtractor 32), providing a serial data stream $DATA_{OUT}$.

The above-described embodiments of the present invention cover a wide range of cost and performance advantages, and will suggest yet other implementations and embodiments to those skilled in the art. The preferred embodiment for a particular application will be the simplest and least expensive implementation which will meet the system designer's performance requirements. For high performance systems, a synchronous demodulator may be required, but for the large majority of applications, a simpler asynchronous implementation will suffice.

What is claimed is:

1. A transmitted reference spread spectrum communication process comprising the steps:

providing a wideband reference signal;

providing an original message signal having a first bandwidth;

convolving the reference signal with the original message signal to form an encoded message signal having a respective bandwidth greater than the first bandwidth;

using the reference signal to form a second encoded signal also having a respective bandwidth greater than first bandwidth;

using a predetermined orthogonal relationship to combine at least the encoded message signal and the second encoded signal to thereby form a combined signal;

transmitting the combined signal over a same communication channel thereby making both the encoded message signal add the second encoded signal subject to similar signal path distortion effects;

receiving the combined signal;

using the predetermined orthogonal relationship to extract at least two signal components from the combined signal; and using a de-convolving process to retrieve the original message signal from said at least two signal components independent of the wideband reference signal.

2. The process of claim 1, wherein said combined signal is a phase quadrature signal having an I component and a Q component orthogonal to said I component; and said two signal components are two orthogonal components of said phase quadrature signal differing in phase by π/2.

3. The process of claim 2, wherein said I component corresponds to one of the encoded signals, and said Q component corresponds to another one of the encoded signals.

4. The process of claim 1, wherein one of the encoded signals is delayed by a first predetermined delay relative to another one of the encoded signals, before the combined signal is transmitted.

5. The process of claim 4, wherein said receiving step further comprises the further step of:

synchronizing a local clock to the received combined signal.

6. The process of claim 4, wherein the second encoded signal is formed by convolving the original message signal with a delayed version of the reference signal.

7. The method of claim 6, wherein more than one message signal is transmitted and the encoded message signal from a preceding stage is used as the reference signal in a subsequent stage.

8. The process of claim 6, wherein said combined signal is a phase quadrature signal having an I component and a Q component orthogonal to said I component; and said two signal components are two orthogonal components of said phase quadrature signal differing in phase by π/2.

9. The process of claim 8, wherein said I component corresponds to one of the encoded signals, and said Q component corresponds to another one of the encoded signals.

10. The process of claim 4, wherein the original message signal comprises a binary signal, during a first state of said binary signal the first encoded signal is equal to said reference signal and the second encoded signal is equal to the reference signal delayed by said first predetermined delay, and during a second state of said binary signal the second encoded signal is equal to said reference signal and the first encoded signal is equal to the reference signal delayed by said first predetermined delay.

11. The process of claim 10, wherein more than one message signal is transmitted and the encoded message signal from a preceding stage is used as the reference signal in a subsequent stage.

12. The process of claim 4, further comprising the steps:

shifting the first extracted signal component in time relative to the second extracted signal component by a second predetermined delay complementary to said first predetermined delay; and de-convolving the time-shifted first extracted signal component with the second extracted signal component to thereby form a first recorrelated signal.

13. The process of claim 12, wherein said second predetermined delay has a magnitude equal to a corresponding magnitude of said first predetermined delay.

14. The process of claim 12, comprising the further steps shifting the second extracted signal component in time relative to the first extracted signal component by said second predetermined delay;

de-convolving the time-shifted second extracted signal component with the first extracted signal component to thereby form a second recorrelated signal; and combining the first and second recorrelated signals to reconstitute said original message signal.

15. The process of claim 14, comprising the further step of:

eliminating any cross coupled noise from the combined recorrelated signals.

16. The process of claim 15, wherein said receiving step comprises the further step of:

synchronizing a local clock to the received combined signal.

17. The process of claim 15, wherein said eliminating step comprises the further steps of:

forming a replica of said cross coupled noise by multiplying the two recorrelated signals, and subtracting the cross noise replica from the reconstituted message signal.

18. The process of claim 15, wherein said eliminating step comprises the further steps of:

integrating each of the recorrelated signals, and comparing the resultant integrated signals.

19. The process of claim 15, wherein said eliminating step comprises the further step of:

ignoring the recorrelated signals when no information is present.

20. The process of claim 14, wherein said combined signal is a phase quadrature signal having an I component and a Q component orthogonal to said I component; and said two signal components are two orthogonal components of said phase quadrature signal differing in phase by π/2.

21. The process of claim 20, wherein said I component corresponds to one of the encoded signals, and said Q component corresponds to another one of the encoded signals.

22. The process of claim 14, wherein the original message signal has a binary clock component and a binary data component, the predetermined delay is used to form a second reference signal in the form of a delayed copy of said wideband reference signal, one of the two binary components is convolved with only one of the two reference signals, the other binary component is convolved with both of the reference signals, a first logical combination of the two recorrelated signals constitutes a retrieved clock signal corresponding to the clock binary component of the original message signal, and a second logical combination of the two recorrelated signals constitutes a retrieved data signal corresponding to the data binary component of the original message signal.

23. The process of claim 22, wherein one said logical combination is either a sum or a difference, and the other said logical combination is an exclusive or of both a sum and a difference.

24. The process of claim 22, wherein during a first state of said other binary component the first encoded signal is equal to the wideband reference signal and the second encoded signal is equal to second reference signal and during a second state of said other binary component the second encoded signal is equal to said wideband reference signal and the first encoded signal is equal to said second reference signal.

25. The process of claim 4, wherein the predetermined delay is fixed.

26. The process of claim 4, wherein said combined signal has an I phase component and a Q phase component differing in phase by $\pi/2$; and said I component and said Q component are each associated with a different respective one of said two encoded signals.

27. The process of claim 26, wherein said combined signal is a phase quadrature signal having a non-zero carrier frequency and said transmitting step includes modulating each of said I and Q components with a different respective one of said two encoded signals.

28. The process of claim 4, wherein a particular value of the predetermined delay is used to distinguish the combined signal from other transmitted reference spread spectrum signals being transmitted over said communication channel.

29. The process of claim 28, wherein the predetermined delay is variable.

* * * * *

UNITED STATES PATENT AND TRADEMARK OFFICE
CERTIFICATE OF CORRECTION

PATENT NO.   : 5,559,828
DATED        : September 24, 1996
INVENTOR(S)  : John T. Armstrong and John D. Richert It is certified that error appears in the above-indentified patent and that said Letters Patent is hereby corrected as shown below:

Column 5, line 42, delete "furthers" and insert -- further --.

Column 10, line 4 delete "SOB" and insert --50B --.

Line 10 delete "Signal" and insert -- signal --.

Column 11, Table 1 No. 6 Col. 3, delete "Note+" ' and insert --Note + --.

Column 15, line 3 delete "add" and insert -- and --.

Column 16, line 30, Claim 17, after "cross" insert -- coupled--.

Signed and Sealed this

Sixth Day of January, 1998

Attest:

BRUCE LEHMAN

Attesting Officer

Commissioner of Patents and Trademarks